UNITED STATES PATENT OFFICE.

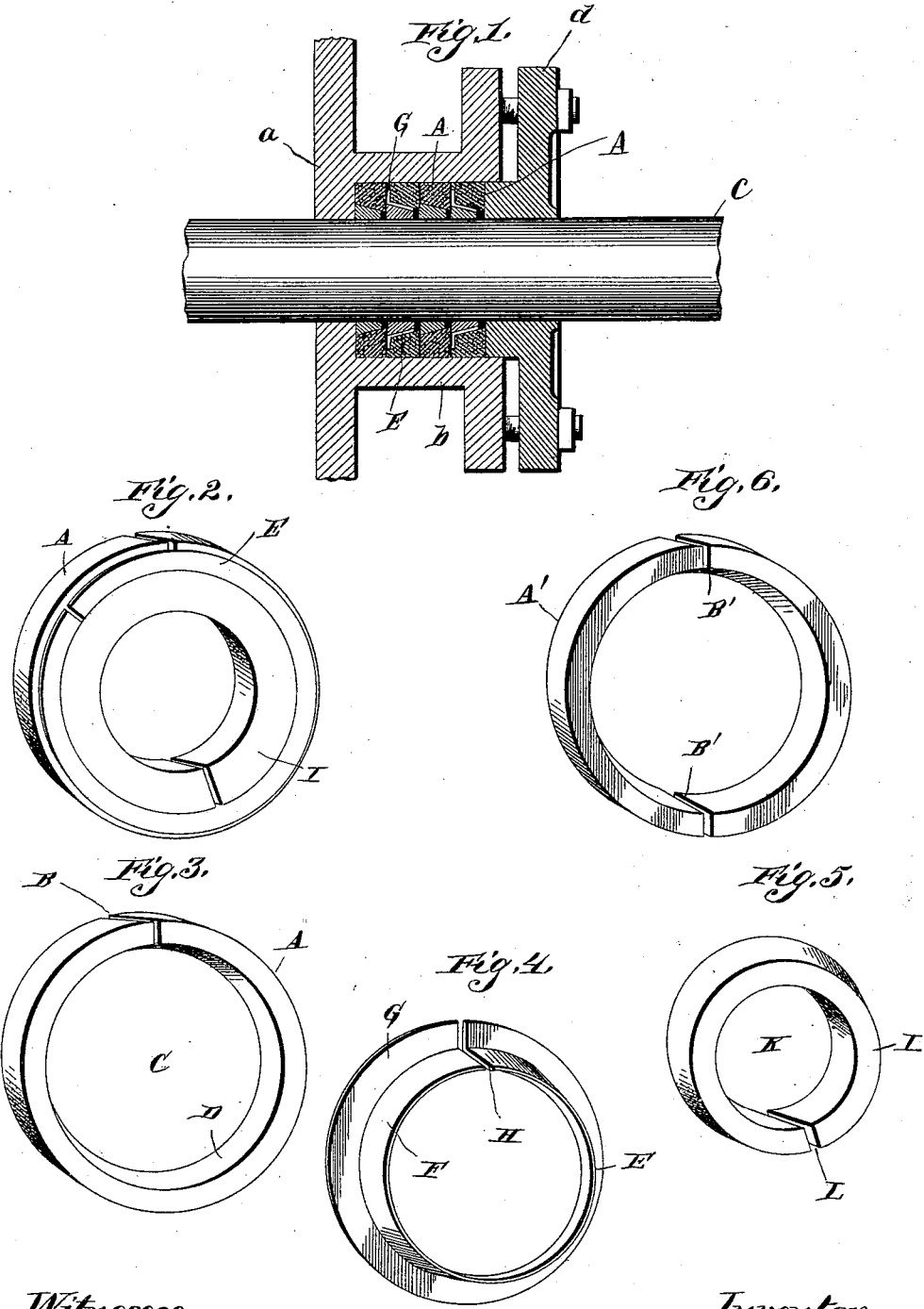

JOHN P. MURRAY, OF JERSEY CITY, NEW JERSEY, ASSIGNOR OF TWO-THIRDS TO ROBERT DAVIS AND MARK CURLEY, OF SAME PLACE.

PACKING FOR PISTON-RODS.

SPECIFICATION forming part of Letters Patent No. 404,493, dated June 4, 1889.

Application filed February 27, 1889. Serial No. 301,360. (No model.)

*To all whom it may concern:*

Be it known that I, JOHN P. MURRAY, a resident of Jersey City, in the county of Hudson and State of New Jersey, have invented certain new and useful Improvements in Packing for Piston-Rods; and I do hereby declare the following to be a full, clear, and exact description of the invention, such as will enable others skilled in the art to which it pertains to make and use the same.

My invention relates to an improvement in packing for piston-rods, designed to be used in the stuffing-boxes of cylinder-heads; and it consists in the peculiar construction and combination of devices hereinafter described and claimed.

In the accompanying drawings, Figure 1 is a sectional view of a cylinder-head and stuffing-box provided with a packing embodying my improvements. Fig. 2 is a detail perspective view of my improved packing. Fig. 3 is a similar view of the outer ring. Fig. 4 is a similar view of the metallic expansion-ring. Fig. 5 is a similar view of the inner packing-ring. Fig. 6 is an elevation of a modified form of my invention.

The cylinder-head $a$, the stuffing-box $b$, and the piston-rod $c$ are of the usual well-known construction.

A represents a packing-ring, which is made of rubber, composition of asbestus and rubber, or of other suitable packing composition. The said ring is split by providing it with an oblique cut B, and the central opening C of the ring is conical in form and is thereby provided with flared sides D.

Fitted in the opening C is a metallic expansion-ring E, which is preferably made of resilient sheet metal and is flared in cross-section, as at F, and thereby adapted to fit in the opening C. At the outer edge of the metallic ring is a vertical annular flange G, which bears against one side of the packing-ring A and serves to retain the ring E therein, and also to protect the packing-ring against the disintegrating action of steam. The metallic expansion-ring E is split by providing it with a cut H, which may be either diagonal or transverse.

An inner packing-ring I, of similar material as the packing-ring A, is fitted within the metallic expansion-ring and has its outer edge beveled, and is thereby adapted to fit snugly in the flared interior of the metallic ring. The said interior packing-ring has a central circular opening K, through which the piston-rod extends, and is split by means of an oblique cut L. Several series of the packing and metallic expansion rings thus assembled may be employed in a single stuffing-box, as shown in Fig. 1, or only one of said series may be employed, according to the conditions of the case.

When the gland $d$ of the stuffing-box is screwed therein, it compresses the packing-rings A and I and causes them to contract on centrally-converging lines, and thereby the interior ring I is caused to snugly compress the piston-rod. As the said packing-ring I wears by the friction of the piston-rod, the inherent resilience of itself and of the extension-ring A causes it to contract to compensate for wear.

In the event that the interior packing-ring should wear eccentrically, and thereby bind on the piston-rod and impair the steam-joint, or in case there should be any variation in the piston-rod, the metallic ring E, by expanding, will correct the adjustment of the said interior ring and preserve its proper concentricity with the piston-rod and the exterior packing-ring.

In Fig. 6 I illustrate a modified form of my invention, in which I employ an exterior packing-ring A', which is made of metal and is divided into two separate and distinct parts by cuts B', for the purpose of permitting expansion when necessary for proper adjustment.

Having thus described my invention, I claim—

1. The combination of the exterior split packing-ring A, having the flared central opening C, the sheet metallic split expansion-ring E, flared in cross-section F to fit in said opening, and having the annular flange G, bearing on one side of said exterior packing-ring, and the split interior packing-ring I, having its exterior edge beveled to fit in the metallic expansion-ring, the said exterior ring being fitted in the packing-gland, and said interior ring being fitted on the piston-rod, substantially as described.

2. The combination of the exterior ring, having the flared opening, the sheet metallic split expansion-ring, flared in cross-section to fit in said opening and having the flange bearing on one side of the said ring; and the split interior packing-ring having its exterior edge beveled to fit in the flared expansion-ring, substantially as described.

In testimony whereof I have signed this specification in the presence of two subscribing witnesses.

JOHN P. MURRAY.

Witnesses:
MARK CURLEY,
SCHUYLER DURYEE.